United States Patent [19]

Skjaeveland

[11] Patent Number: 5,713,421
[45] Date of Patent: Feb. 3, 1998

[54] REVERSIBLE PLOUGH/SEED PREPARATION DEVICE COMBINATION

[75] Inventor: Magne Skjaeveland, Klepp Stasjon, Norway

[73] Assignee: Kverneland Klepp AS, Kvernaland, Norway

[21] Appl. No.: 583,101
[22] PCT Filed: May 24, 1995
[86] PCT No.: PCT/GB95/01188
 § 371 Date: Jan. 16, 1996
 § 102(e) Date: Jan. 16, 1996
[87] PCT Pub. No.: WO95/34195
 PCT Pub. Date: Dec. 21, 1995

[30] Foreign Application Priority Data

May 31, 1994 [GB] United Kingdom ............ 9410822
Dec. 29, 1994 [GB] United Kingdom ............ 9426343

[51] Int. Cl.⁶ ..................................................... A01B 17/00
[52] U.S. Cl. ........................................... 172/161; 172/204
[58] Field of Search ......................... 172/161, 162, 172/204, 206, 207, 209, 229

[56] References Cited

U.S. PATENT DOCUMENTS

| | | | |
|---|---|---|---|
| 2,796,816 | 6/1957 | Gray | 172/162 |
| 3,357,500 | 12/1967 | Harris | 172/161 |
| 3,523,584 | 8/1970 | Godbersen | 172/161 |

FOREIGN PATENT DOCUMENTS

| | | |
|---|---|---|
| 0 271 119 | 6/1988 | European Pat. Off. |
| WO 90/07865 | 7/1990 | WIPO |
| WO 93/17541 | 9/1993 | WIPO |

*Primary Examiner*—Terry Lee Melius
*Assistant Examiner*—Christopher J. Novosad
*Attorney, Agent, or Firm*—Sheridan Ross P.C.

[57] ABSTRACT

An integrated combination of a reversible plow and a soil preparation device which includes a headstock, a carrying beam, a carrying arm mounted at one end of the combination, and at its other end having a swivel mounting. The carrying beam is mounted on a mounting block. The carrying arm is coupled with the mounting block so that the soil preparation device can take up a cooperative working position automatically after each plow body reversal. The carrying arm is adjustably mounted on the mounting block via a pivotable coupling.

9 Claims, 4 Drawing Sheets

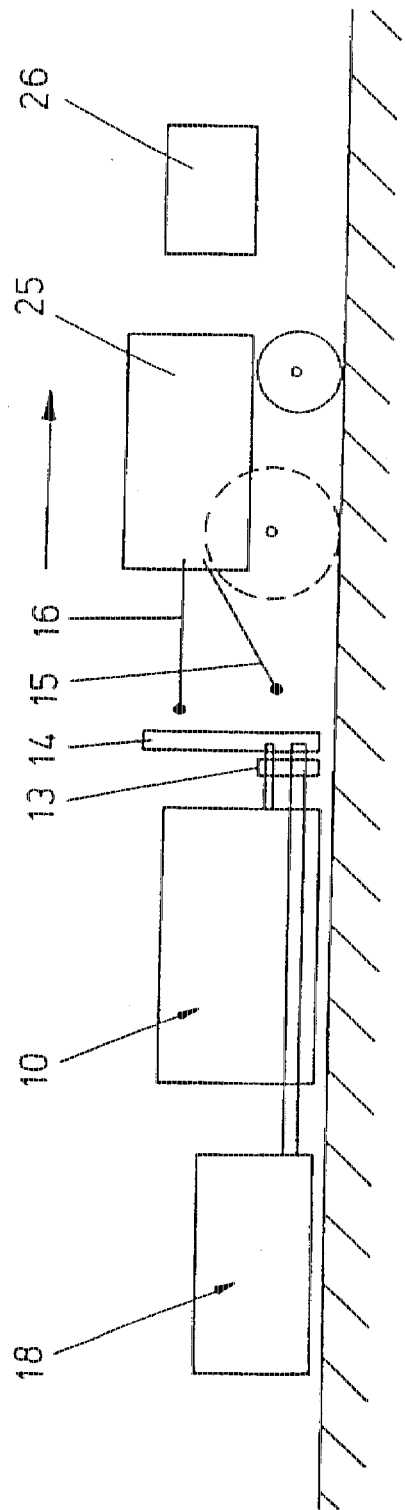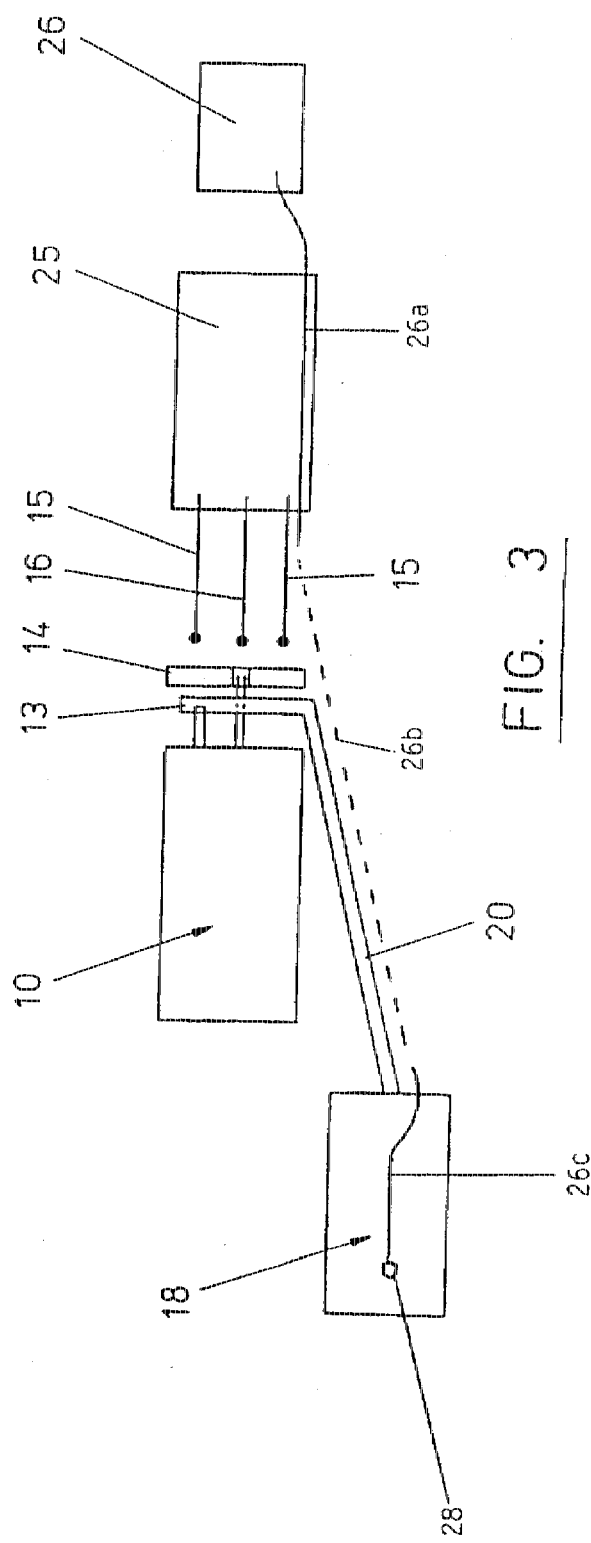

REVERSIBLE PLOUGH/SEED PREPARATION DEVICE COMBINATION

This invention relates to a combination of a reversible plough and a seed preparation device, said combination being adapted to be fully mounted or semi-mounted on a rear lifting device of a propelling vehicle.

The invention has been developed primarily in connection with a reversible plough/packer combination (an integrated combination) which is adapted to be fully mounted on the usual three point rear lifting hitch at the rear of a tractor, but it should be understood that the invention is not restricted to such a combination. The invention therefore is intended to include the possibility of use of: (1) other types of seed preparation device than a "packer" e.g. a set of harrows; (2) a semi-mounted combination; (3) mounting at the rear of a suitable propelling vehicle other than a tractor; (4) the integration of a seed distribution device; (5) any combination of items 1 to 4.

A combination of a reversible plough/packer is known e.g. from a fully mounted combination shown in Swedish Patent Application No 9200744-2, or a semi-mounted combination from PCT/GB93/00492, and in which the packer remains "integrated" with the reversible plough in the sense that it remains coupled with it during each reversal of the plough bodies (which takes place after each ploughing pass along a field prior to a return pass in an opposite direction adjacent to the first pass). The packer is able to move to a suitable position to cooperate with each set of plough bodies upon each reversal of the plough bodies.

A major factor which contributes to the ability of the packer to move between right side ploughing and left side ploughing with respect to the tractor comprises a specially designed swivel mounting (see each case for more detail) which supports a packer arm on which the packer wheels are mounted (usually sets of vertical packer wheels or discs) so that the packer arm is able to pivot about a substantially horizontal swivel axis provided by the mounting so that the packer wheels remain in a substantially horizontal plane while the main plough beam on which the reversible plough bodies are mounted carries out orbital movement about a substantially horizontal axis provided by the usual headstock. (The construction and operation of both fully mounted and semi-mounted reversible ploughs is well known to those skilled in the art and is therefore not described or illustrated in detail herein).

In existing designs of integrated plough/packer combinations, the packer is mounted behind the plough bodies with respect to the direction of travel and in a partially lateral overlap arrangement, whereby the packer carries out seed bed preparation on part only of the soil turned over by some of the plough bodies in any one pass, while simultaneously carrying out seed bed preparation on part of the soil turned-over by the plough bodies during a previous pass in a reverse direction. Therefore, the packer forms a suitable seed bed on the ploughed soil by carrying out approximately 50% of its action immediately behind the soil ploughed by the plough bodies in one pass while simultaneously carrying out seed bed preparation on approximately the remaining 50% of the ploughed but unpacked soil ploughed during the previous pass of the combination.

The integrated plough/packer combination which is the subject of each earlier patent application represents a significant innovation in the art, giving rise to major technical advantage. However, because the packer is laterally off-set partly relative to the plough bodies, in either ploughing position, it can cause difficulties in carrying out the first ploughing pass along the edge of a field, and especially when there is a hedge, fence, or other obstacle defining the edge of the field. This difficulty arises because of the lateral overlap of the packer with respect to the plough bodies.

In one aspect, therefore, the invention seeks to provide an integrated reversible plough/soil preparation device combination, which provides independent adjustment of the plough frame, and the soil preparation device, whereby in any desired pass across a field any one of the following modes of operation can be achieved: (1) ploughing only; (2) soil preparation only; or (3) ploughing and soil preparations simultaneously.

Therefore, in this aspect of the invention, the combination can carry out ploughing only during the first pass along a field, which will usually be along the edge of the field, and up to the usual turning "headland", and then can be adjusted to carry out combined ploughing and soil preparation during the subsequent return pass, and thereafter for each successive pass up to the final pass across the field, which will usually be soil or seed bed preparation only.

According to this one aspect of the invention there is provided an integrated combination of a reversible plough and a soil preparation device, said combination being intended to be mounted on a suitable lifting device at the rear of a propelling vehicle, and to be capable of carrying out a combined ploughing and soil preparation action during a single pass across a field in either working position of the reversible plough bodies, in which the combination comprises:

a headstock;

a carrying beam having a number of pairs of plough bodies arranged along its length, said beam being capable of being rotated about a substantially horizontal pivot axis relative to the headstock in order to reverse the plough bodies at the end of each pass across a field prior to an adjacent return pass;

a soil preparation device having a carrying arm mounted on the combination via a swivel mounting in such a way that the device can be adjusted automatically with each reversal of the plough bodies, to take-up a suitable position to cooperate with the plough bodies when each reversal is completed; and, a mounting block on which said carrying beam is mounted, said block being pivotably mounted on the headstock so as to be capable of pivoting with the carrying beam through approximately 180° in order to reverse the plough bodies;

characterised in that:

1. the carrying arm is also coupled with said mounting block so that the carrying arm can move with the block and with the carrying beam during each plough body reversal so that the soil preparation device can take-up a cooperating position automatically after each plough body reversal; and 2. the carrying arm is adjustably mounted on said mounting block via a pivotable coupling which allows the carrying arm to be adjusted independently of the carrying beam.

Preferably, the carrying arm is adjustable independently about a first generally horizontal axis in order to carry out independent adjustment of the height of the soil preparation device.

Alternatively, or additionally, the carrying arm may be adjustable independently of the carrying beam about a generally upwardly extending axis in order to carry out independent adjustment of the soil preparation device laterally.

In a preferred embodiment of the invention, there is the capability of independently adjusting (1) the height and (2) the lateral position of the soil preparation device, and which gives the advantage that, when required, the soil preparation device can be adjusted upwardly about the first axis and then laterally inwardly about the second axis to take up an inoperative position above the plough. This allows the combination to carry out ploughing only, and with the overall width of the combination reduced, whereby the combination can carry out ploughing e.g. the first pass along the edge of a field, and in which the presence of a hedge, fence or other obstacle at the field edge does not obstruct the passage of the combination (if the soil preparation device was in its operative position, it would project laterally of the plough and the tractor on the side facing the field edge).

After carrying out this first pass along the field edge, the combination can then be turned around ready for a return pass adjacent and parallel to the first pass and with the plough bodies reversed, and the soil preparation device lowered (about the first axis) and outwardly adjusted (about the second axis) to a position of cooperation therewith.

Preferably, the soil preparation device is laterally spaced from the plough, when both are in their operative positions, so that there is substantially no overlap between them (when viewed longitudinally of the combination), whereby the soil preparation device carries out seed bed preparation on each previous pass of ploughed land simultaneously with the plough carrying out ploughing along the current pass.

Preferably, the soil preparation device comprises a packer which may comprise any suitable arrangement of packer rings known per se.

The independent adjustability of the packer via its carrying arm allows the combination to operate in any one of three modes:

1. Ploughing only (suitable for first pass along a field edge with the packer upwardly and inwardly adjusted to the inoperative positions);
2. Ploughing and packing simultaneously, with both the plough and the packer in the working positions, and in which the plough/packer combination can be reversed at the end of each pass prior to a return pass along the field;
3. Packing only, with the plough raised to an inoperative position by raising of the common mounting block, and in which the packer is downwardly adjusted about said first axis to engage the ploughed ground.

In a preferred embodiment, the combination is also provided with a seed distribution system which is able to carry out simultaneous seeding of the ground after it has been prepared by the packer, and the seed distribution system is also integrated with the combination in the sense that it can be moved automatically with the packer and the plough carrying beam during each plough body reversal.

The distribution system may be mounted on the packer, and have a distribution head to which seed e.g. grain is delivered from a supply hopper, and distribution pipes lead to seed delivery heads located immediately behind the packer wheels. Any suitable known arrangement may be provided to form seed-receiving channels in the soil, and to cover over the channels after seeding.

A storage hopper for the seed may be mounted at any convenient fixed location relative to the tractor and the combination coupled therewith, the location of the hopper being such that it does not move with any of the component parts of the combination during adjustment, and also does not impede the movement of any such parts.

In a convenient arrangement, a storage hopper is mounted at the front of the tractor or propelling vehicle, and a distribution pipe may be routed over and/or alongside the tractor from the hopper to the distribution head in any convenient manner. Usually, an air compressor is incorporated in the seed distribution system, to blow a flow of conveying air along the distribution pipe for the purposes of distributing the seed to the distribution head.

In a further aspect of the invention, the carrying arm (which carries the soil preparation device) is mounted on the headstock by any suitable means which includes said pivotably mounting, whereby the carrying arm can be moved (at the same time as the carrying beam for the plough bodies during plough body reversal) in order that the soil preparation device can take up a position of co-operation with the plough bodies after each reversal.

Accordingly, in a further aspect of the invention, there is provided an integrated combination of a reversible plough and a soil preparation device, said combination being intended to be mounted on a suitable lifting device at the rear of a propelling vehicle, and to be capable of carrying out a combined ploughing and soil preparation action during a single pass across a field in either working position of the reversible plough bodies, in which the combination comprises:

a headstock;

a carrying beam having a number of pairs of plough bodies arranged along its length, said beam being capable of being rotated about a substantially horizontal pivot axis relative to the headstock in order to reverse the plough bodies at the end of each pass across a field prior to an adjacent return pass;

a carrying arm mounted at one end on the combination, and at its other end having a swivel mounting by means of which ground working elements of the device are mounted on the carrying arm for rotation about a pivot axis provided by the swivel mounting, whereby the device can be adjusted automatically with each reversal of the plough bodies, to take-up a suitable position to cooperate with the plough bodies when each reversal is completed; and, a mounting block on which said carrying beam is mounted, said block being pivotably mounted on the headstock so as to be capable of pivoting with the carrying beam through approximately 180° in order to reverse the plough bodies;

characterised in that the carrying arm is mounted on the headstock in such a way that the carrying arm can move with the carrying beam during each plough body reversal so that the soil preparation device can take-up a cooperative working position automatically after each plough body reversal; and in that the mounting of the carrying arm on the headstock includes a pivotable coupling which allows the carrying arm to be adjusted independently of the carrying beam and the plough bodies.

A preferred embodiment of an integrated combination of a reversible plough and a soil preparation device according to the invention will now be described in detail, by way of example only, with reference to the accompanying drawings, in which:

FIG. 2 is a schematic side illustration of a plough/packer combination according to the invention;

FIG. 3 is a schematic plan view corresponding to FIG. 2;

Figures 5, 6:
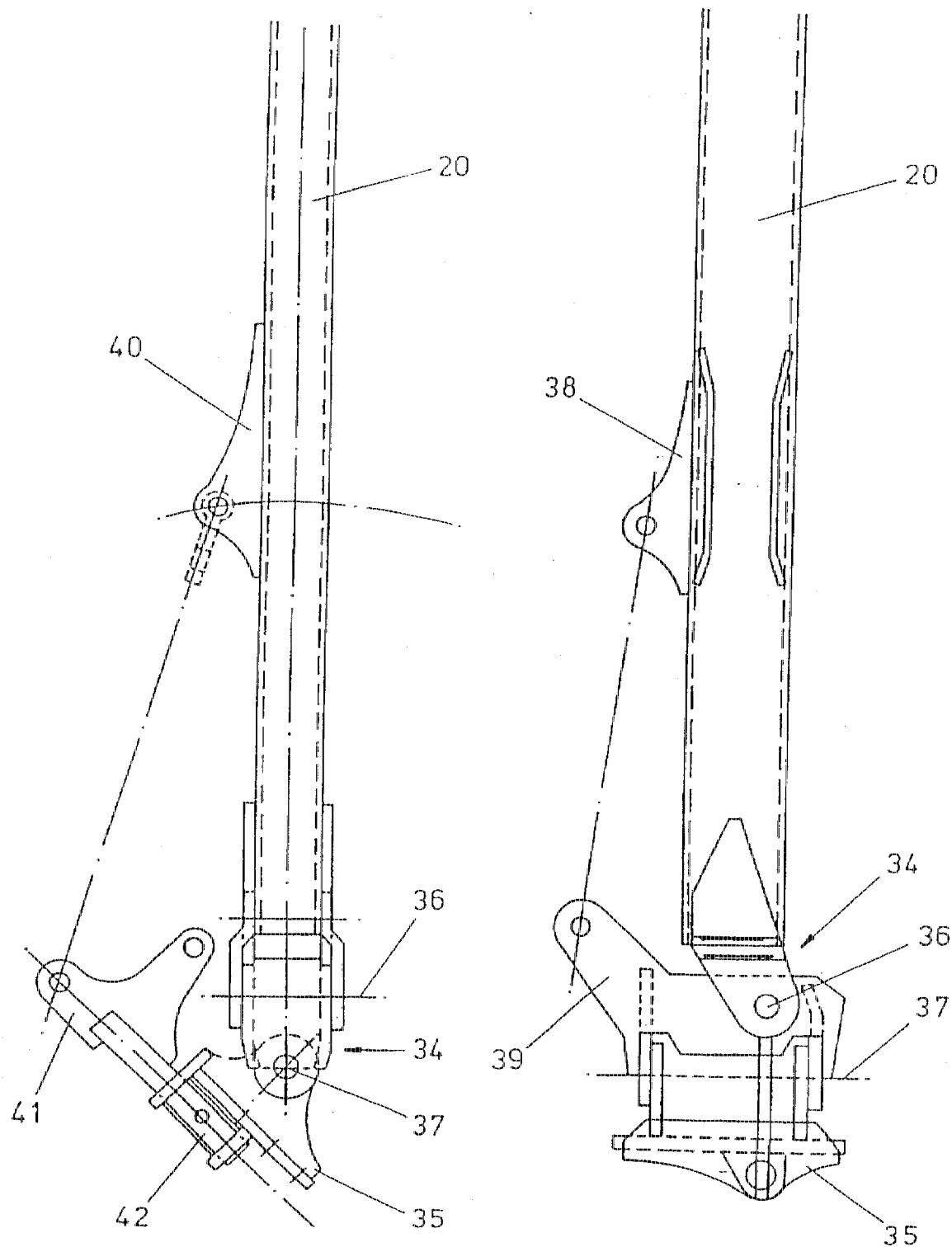

FIG. 5 is detail plan view illustrating a double pivot coupling arrangement by which a carrying arm of the soil preparation device is mounted on a common mounting block on which a carrying beam of the reversible plough is also mounted, such mounting block being rotatable about a substantially horizontal axis through 180° relative to the usual headstock, in order to reverse the plough bodies; and, FIG. 6 is a side view, corresponding to the plan view of FIG. 5.

Figure 1:
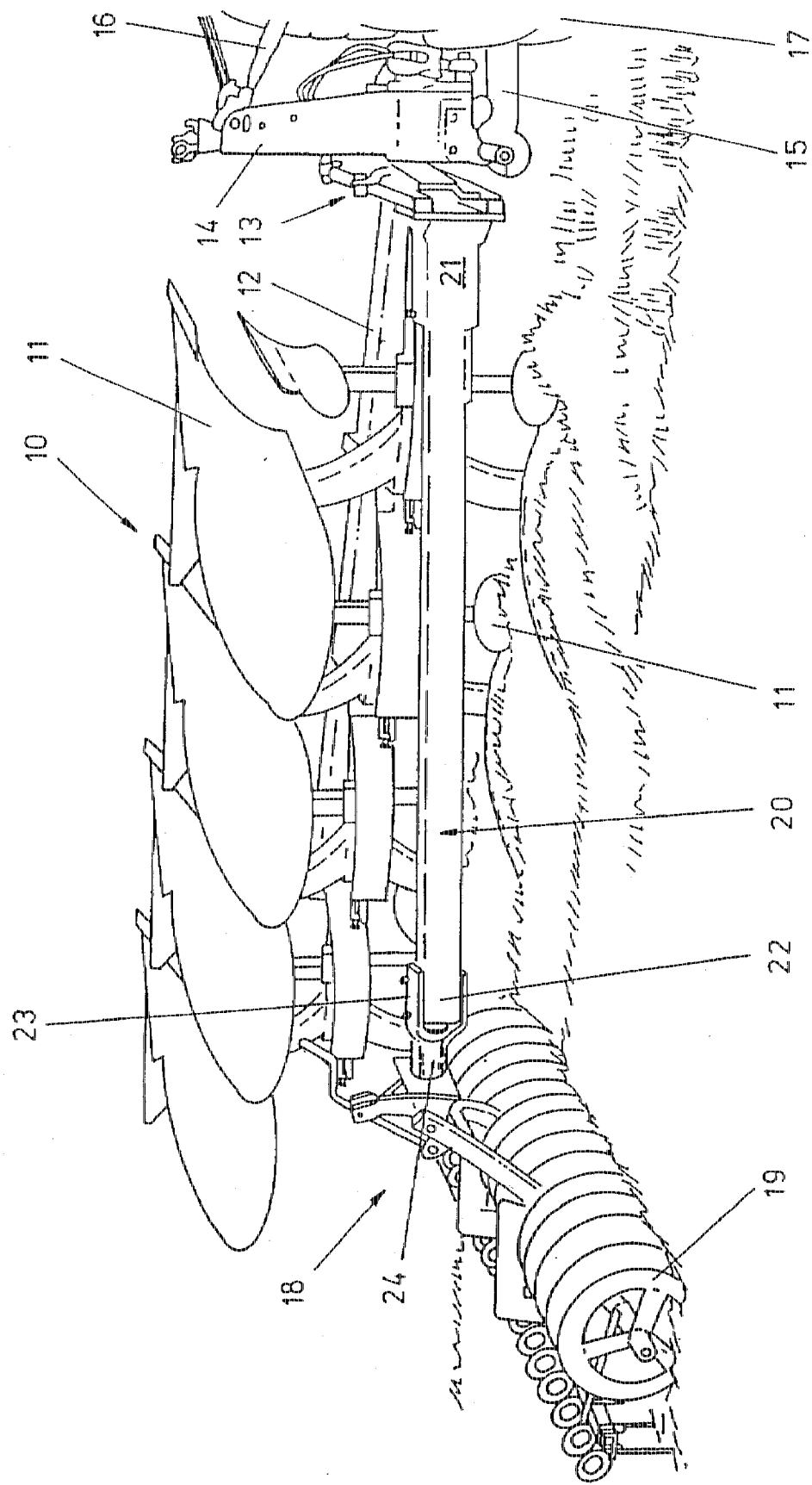
FIG. 1 is a perspective side illustration of an integrated combination of a reversible plough and packer combination, to which the invention may be applied.

Referring now to the drawings, and in particular FIG. 1 thereof, this shows a perspective side view illustration of an integrated combination of reversible plough/packer combination, to which the invention may be applied. The reversible plough is illustrated having four pairs of reversible plough bodies, mounted on a common carrying beam in well known manner, and which is mounted on a common mounting block carried by a usual headstock, and arranged whereby the carrying beam can carry out orbital movement about a substantially horizontal pivot axis through about 180°, in order to reverse the plough bodies.

The reversible plough part of the combination is designated generally by reference 10, and comprises usual pairs of plough bodies 11 mounted on a carrying beam 12 which is mounted at its forward end on a mounting block 13 which, in turn, is pivotably mounted upon a usual headstock 14. The headstock 14 is adapted to be mounted on the usual lower links 15, and top link 16 of a three point lifting device provided at the rear of an agricultural tractor or other propelling vehicle, which is not shown in detail in the drawings, but of which the rear wheels are shown partly as designated by reference 17. As will be apparent to those skilled in the art, mounting block 13 can be rotated about a substantially horizontal pivot axis relative to the headstock 14 through about 180°, in order to rotate the carrying beam 12 and the plough bodies 11 carried thereby from one working position to another working position e.g. from left side ploughing to right side ploughing.

A soil preparation device forms part of the integrated combination, and in the illustrated arrangement comprises a packer 18 which comprises a set of horizontally spaced packer wheels or rings 19, which are freely rotatable, and the purpose of which is to breakdown the soil turned over by the plough bodies to form a seed bed into which seed can be sown subsequently. Packer 18 is illustrated as one example only of a soil preparation device which may form part of an integrated reversible plough/soil preparation device combination according to the invention.

The packer 18 is mounted at the trailing end of a carrying arm 20 which is mounted at its forward end 21 on the headstock 14, such that the carrying arm 20 also can be rotated about the common pivot axis provided by the headstock 14, during rotation of the carrying beam 12 in order to reverse the plough bodies.

In addition, the mounting of the carrying arm 20 on or in the integrated combination may be such that adjustment of the packer 18 can be carried out independently of the carrying beam 12 and the plough bodies 11. This adjustment may be (a) upwardly or downwardly about a substantially horizontal axis; (b) laterally about a generally upright axis; or (c) upward or downward adjustment movement about a substantially horizontal axis and separate, or combined movement about a generally upright axis.

The trailing end 22 of the carrying arm 20 is provided with a swivel coupling 23 which mounts the packer 18 on the beam 20. The coupling 23 is sufficiently robust to transfer necessary traction force from beam 20 to the packer 18, during operation, but in addition is able to bear the weight load of the packer 18 when the plough bodies are reversed, which usually takes place first by lifting of the lift arms 15 of the tractor, followed by rotation of the carrying arm 20 and plough beam 12 so as to adjust the plough bodies from one working position to the other working position. The coupling 23 is a swivel coupling, defining a generally horizontal swivel or pivot axis provided by a pivot (not shown in detail) mounted within an integral mounting sleeve 24 forming an integral part of the swivel coupling 23. The swivel coupling allows the packer 18 to maintain a substantially horizontal attitude while plough body reversal takes place, and the packer 18 is lifted from the ground from a working position at one side of the tractor, to a working position on the other side of the tractor, with respect to the longitudinal axis of the tractor and combination.

The integrated combination of reversible plough 10 and packer 18, as shown diagrammatically in FIG. 1 of the drawings, comprises one example of a combination to which the invention may be applied, and to serve as background to the subsequent description of a preferred embodiment of the invention.

Having regard to the above description and diagrammatic illustration in FIG. 1, it will be evident that packer 18 and reversible plough 10 must either: work together to carry out a combined ploughing and packing operation during a single pass of the combination along a field, or else both can be raised to an inoperative and transport position by raising of the lift arms 15 of the tractor hitch. Following lifting of the tractor hitch, plough carrying frame 12 and packer carrying arm 20 may be rotated through approximately 90° via the common mounting block 13, relative to headstock 14, so that the combination then takes-up a transport position. However, evidently the combination, when adjusted to either working position, will not be able to carry out a satisfactory first pass along the edge of a field, since regardless of whether the plough bodies are adjusted to right side, or left side ploughing, the packer wheels 19 of the packer 18 will be drawn through unploughed ground during this first pass. Further, assuming that the reversible plough 10 takes-up the position shown in FIG. 1, and is required to plough closely adjacent to the edge of a field, evidently the lateral projection of the packer 18 in a direction towards the field edge will mean that the combination cannot closely approach the field edge, since it must provide space for forward movement of the packer 18. Furthermore, in the event of any hedge or fence, or other obstacle defining the edge of the field, this will prevent the combination approaching the field edge closely, and therefore leave this portion of the field unploughed.

The preferred embodiment of the invention which will now be described seeks to provide an integrated plough/soil preparation device combination in which independent adjustment of the soil preparation device is possible, relative to the reversible plough, whereby the combination can operate in any one of the following three modes:

1. Ploughing only suitable for first pass along a field edge with the soil preparation device (packer) upwardly and inwardly adjusted to an inoperative position;
2. Ploughing and soil preparation (packing) simultaneously, with both the plough bodies and the packer in working positions, and in which the plough/packer combination can be reversed at the end of each pass prior to a return pass along the field;
3. Packing only, with the plough raised to an inoperative position by raising of the common mounting block and the tractor lifting arms, and in which the packer is downwardly adjusted to engage the previously ploughed ground.

An integrated plough/soil preparation device combination according to the invention may also have an integral seed distribution system mounted thereon, although this is not absolutely essential to the claimed invention.

Referring now to FIGS. 2 and 3 of the drawings, these are schematic side view and plan view illustrations of a preferred embodiment of combination according to the invention. A tractor or other propelling vehicle is designated generally by reference 25, and has rear lower lifting arms 15 and adjustable top link 16 known per se, and which can be operated in order to raise and lower headstock 14. The reversible plough is shown schematically again by reference 10, and the soil preparation device/packer by reference 18 and it will be noted particularly from the plan view of FIG. 3 that packer 18 is laterally off-set from plough 10 such that there is substantially no overlap between them, when viewed in the general direction of the longitudinal axis of the combination. This means that packer 18 carries out soil preparation action on soil turned over by the plough bodies 11 of reversible plough 10 during a previous pass along a field. Simultaneously, the plough bodies turn over adjacent and previously unploughed ground. In this preferred embodiment, the packer arm 20 is mounted indirectly on the headstock via common mounting block 13 as shown schematically in FIGS. 2 and 3, and on which both plough carrying beam 12 and packer arm 20 are mounted. However, the invention includes other means for mounting the packer arm 20 on the headstock 14.

The novel manner by which the forward end of packer arm 20 is mounted on the common mounting block 13 will be described in more detail below with reference to FIGS. 5 and 6. However, first description will be made of a preferred additional integrated component of the combination, with reference to FIGS. 2 and 3, as shown schematically, and also as shown in more detail in FIG. 4.

If it is desired to provide an integrated combination which is also capable of carrying out seeding, simultaneously with ploughing and packing, a seed distribution system may be integrated in the combination. This requires provision of a storage hopper for the seed, which is mounted at any convenient fixed location relative to the tractor, so as not to move with any of the component parts of the combination during adjustment, and also not to impede the movement of any such parts. Conveniently, the storage hopper is mounted at the front of the tractor, as shown schematically by reference 26, and an air distribution pipe may be routed over and/or alongside the tractor to extend from the hopper 26 to a seed distribution head 28 (described below with reference to FIG. 4) in any convenient manner (the pipe is shown schematically by full line reference 26(a) as it is routed along side the tractor 25, by dashed line 26(b) as it extends from the tractor 25 to the device, and by full line reference 26(c) as it extends to the discharge head 28). Also, an air blower (not shown) may be incorporated in the distribution system, to form a pressurised flow of air to convey seed from the hopper 26 to the distribution head.

Figure 4:
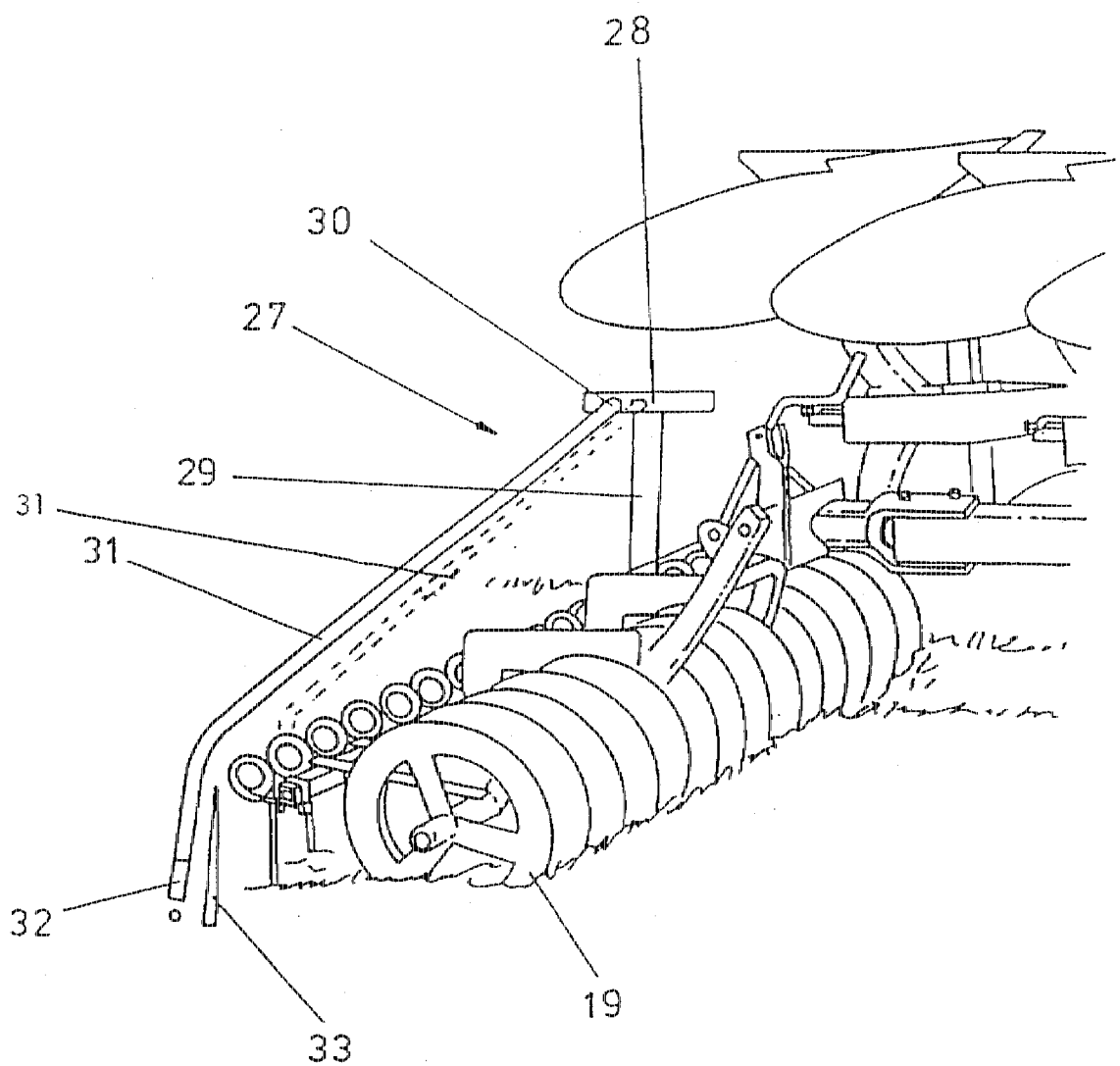
FIG. 4 is a schematic illustration of part of a seed distribution system mounted on the soil preparation device to form a further part of an integrated combination according to the invention.

Referring now to FIG. 4, there is shown schematically a seed distribution device which is integrated with the packer 18, in the sense that it is able to move with the packer 18 during each reversal of the plough bodies. The seed distribution device is designated generally by reference 27 and comprises a distribution head 28 to which seed is distributed via an upwardly extending supply tube 29, which tube 29 is connected via the distribution pipe (not shown) running via any convenient route forwardly over and/or alongside the tractor to connect with the hopper 26. The distribution head 28 has a number of separate outlets, only one of which is shown by reference 30, and which communicates with a flexible feed pipe 31 which terminates at its lower and rearward end 32 behind the packer wheels 19 and also behind a respective finger 33 which forms a seed-receiving channel in the prepared soil. A trailing device (not shown) may be provided to cover over the soil after the seeds have been distributed into the ground.

Referring now to FIGS. 5 and 6 of the drawings, these are detail illustrations only of the packer carrying arm 20, and the adjustable coupling at its forward end which permits independent adjustment of the packer 18 relative to reversible plough 10. FIG. 5 is a plan view, showing how lateral inward and outward adjustment of the packer arm can be obtained, whereas FIG. 6 is a side view showing how the packer arm can be adjusted upwardly and downwardly.

The carrying arm 20 of the packer therefore is coupled with the common mounting block on which the carrying beam 12 of the reversible plough 10 is also mounted, whereby the carrying arm 20 can move with the block 13, relative to headstock 14, during each plough body reversal so that the packer can take-up a cooperative working position automatically after each plough body reversal.

The carrying arm 20 for the packer 18 is adjustably mounted at its forward end on the common mounting block 13, via a pivotable coupling which is designated generally by reference 34, and only one end portion 35 of the mounting block 13 is shown in FIGS. 5 and 6. The coupling 34 allows the carrying arm 20 to be adjusted about a first generally horizontal axis 36 in order to carry out independent adjustment of the height of the packer 18, and about a second generally upwardly extending axis 37 in order to carry out independent adjustment of the packer 18 laterally. (If the carrying arm 20 is mounted on the headstock 14 by means other than the mounting block 13, such means (not shown) will include the pivotable coupling 34)

The capability of carrying out independent adjustment of: (1) the height and (2) the lateral position of the packer, gives the advantage that, when required, the packer can be adjusted upwardly about the first axis 36 and then laterally inwardly about the second axis 37 to take-up an inoperative position above the reversible plough 10. This allows the combination to carry out ploughing only, and with the overall width of the combination reduced, whereby the combination can carry out ploughing e.g. the first pass along the edge of a field, and in which the presence of a hedge, fence or other obstacle at the field edge does not obstruct the passage of the combination.

After carrying out this first pass along the edge of the field, the combination can then be turned around ready for a return pass adjacent and parallel to the first pass, and with the plough bodies reversed, and the packer lowered about first axis 36 and laterally outwardly adjusted about second axis 37 to a position of cooperation with the plough.

The adjustment of the packer arm 20 upwardly and downwardly about first axis 36 can be achieved by operation of an adjusting cylinder (not shown in detail) acting between a pivot mounting 38 provided on arm 20, and a pivot coupling 39 mounted on the end of arm 20, as shown in FIG. 6. Laterally inward and outward adjustment can be obtained by operation of a hydraulic cylinder (not shown in detail) which acts between a pivot coupling 40, also mounted on carrying arm 20, and a pivot coupling 41 mounted on end 35 of coupling block 13. Also, upward and downward adjustment of the packer arm 20 is permitted, by reason of the pivotable connection between coupling 41 and block end 35 via pivot 42.

Operation of the packer only can be carried out by raising the plough 10 to an inoperative position by raising the lift arms 15, and by lowering the packer 18 about pivot axis 36 to contact the ground.

The transport position can be reached by pivoting the packer upwardly and laterally inwardly, followed by raising of the lift arms 15 to lift the entire combination of plough/packer/seed distribution to a transport position of width no greater than that of the tractor.

It is advantageous to provide the facility for a) independent vertical adjustment of the soil preparation device 18 and b) independent lateral adjustment also. However, there can be advantage in providing an arrangement in which only one of these independent adjustment possibilities can be obtained, and such an arrangement is intended to be included within the present invention, as defined in at least some of the following claims.

I claim:

1. An integrated combination of a reversible plough and a soil preparation device, said combination being intended to be mounted on a lifting device at the rear of a propelling vehicle, and to be capable of carrying out a combined ploughing and soil preparation action during a single pass across a field in either working position of the reversible plough, in which the combination comprises:

a headstock;

a carrying beam;

a number of pairs of plough bodies arranged along the length of said carrying beam, said beam being capable of being rotated about a substantially horizontal pivot axis relative to the headstock in order to reverse the plough bodies at the end of each pass across a field prior to an adjacent return pass;

a mounting block on which said carrying beam is mounted, said block being pivotally mounted on the headstock so as to be capable of pivoting with the carrying beam through approximately 180° in order to reverse the plough bodies;

a carrying arm having a forward end by which it is mounted on the combination and a rear end which is coupled with said soil preparation device in order to carry said device;

a swivel mounting at said rear end of the carrying arm and on which said soil preparation device is mounted for rotation about a pivot axis provided by the swivel mounting, said carrying arm being movable with the carrying beam so that said soil preparation device can take up a co-operative working position with the plough bodies automatically when each reversal is completed; and a pivotable coupling which mounts said forward end of carrying arm and which allows the carrying arm to be adjusted independently of the carrying beam and the plough bodies, and about a first generally horizontal axis which extends transversely of the direction of travel, in order to adjust the height of the soil preparation device and about a second generally upwardly extending axis in order to carry out lateral adjustment of said device.

2. A combination according to claim 1, in which the forward end of said carrying arm is mounted on the headstock via the mounting block.

3. A combination according to claim 1, in which the carrying arm is adjustable relative to the carrying beam about said generally horizontal axis and about said upwardly extending axis, in order to take up any required one of three operating modes of the combination, namely 1) combined ploughing and soil preparation; 2) ploughing only; and 3) soil preparation only.

4. A combination according to claim 1, in which said soil preparation device is laterally spaced from the reversible plough when both are in their operative positions, so that there is substantially no overlap between the plough and the device, when viewed longitudinally of the combination, whereby the device can carry out soil preparation on each previous pass of ploughed land simultaneously with the plough carrying out ploughing along the current pass.

5. A combination according to claim 1, in which said soil preparation device comprises a packer having packer rings.

6. A combination according to claim 1, including a seed distribution system incorporated in the combination and operable to carry out simultaneous seeding of the ground after it has been prepared by the combined action of the plough bodies of the reversible plough, and by the soil preparation device.

7. A combination according to claim 6, in which the seed distribution system includes a distribution head mounted on the soil preparation device, seed delivery heads located immediately behind working elements of the soil preparation device, and a number of distribution pipes leading from said distribution head to said seed delivery heads.

8. A combination according to claim 7, including a storage hopper mounted at a fixed location, so as not to move with any of the component parts of the combination during adjustment, and also not to impede the movement of any such parts.

9. A combination according to claim 6, including a storage hopper mounted at the front of a propelling vehicle to which the combination can be coupled, and a distribution pipe routed along the vehicle from the hopper to the seed distribution system.

* * * * *